(12) United States Patent
Rice et al.

(10) Patent No.: US 7,278,310 B1
(45) Date of Patent: Oct. 9, 2007

(54) NON-INVASIVE MEASUREMENT SYSTEM

(75) Inventors: Brett A. Rice, Bloomington, IN (US); Travis M. Andreas, Springville, IN (US); James Eric Scheid, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/311,583

(22) Filed: Dec. 12, 2005

(51) Int. Cl.
*G01F 3/14* (2006.01)
(52) U.S. Cl. ............................................. 73/239
(58) Field of Classification Search ............ None
See application file for complete search history.

(56) References Cited
U.S. PATENT DOCUMENTS

| 3,131,561 | A | * | 5/1964 | Romanowski | 73/861.78 |
| 4,351,515 | A | * | 9/1982 | Yoshida | 267/225 |
| 4,641,522 | A | * | 2/1987 | Lopresti | 73/261 |
| 4,815,318 | A | * | 3/1989 | LoPresti | 73/261 |
| 5,392,648 | A | * | 2/1995 | Robertson | 73/239 |
| 6,239,708 | B1 | * | 5/2001 | Young | 340/606 |
| 6,333,695 | B2 | * | 12/2001 | Young | 340/606 |

* cited by examiner

*Primary Examiner*—Harshad Patel
(74) *Attorney, Agent, or Firm*—Christopher Monsey

(57) ABSTRACT

A non-invasive piston-cylinder measurement system of a cylinder and a piston mounted for axial movement within the cylinder. The cylinder comprises a non-magnetic cylinder wall. A magnet is mounted within the piston. A plurality of magnetically activated switches, such as read switches, is mounted outside of the non-magnetic cylinder wall so as to be activated by piston movement. The measurement system provides a non-invasive means for measuring fluid extruded from a piston-cylinder extruder.

12 Claims, 2 Drawing Sheets

NON-INVASIVE MEASUREMENT SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to piston-cylinder measurement systems and, more particularly, to a non-invasive piston-cylinder extruder measurement system and method of use.

(2) Description of the Prior Art

It may be desirable to measure fluid flow into or out of a piston-cylinder assembly such as a piston-cylinder extruder. An off-the-shelf impeller type flow meter may be utilized for making flow measurements in a piston-cylinder extruder if the extruder operates with low viscosity liquids under low pressure. However, for use with high viscosity, high pressure liquids, and for use with certain types of explosives, impeller type flow meters have significant problems. An impeller type flow meter sensor not only reduces the maximum flow rate in the extruder tube, but also creates a "pinch point", because of the flow meter's moving impeller in the presence of the explosives.

Non-invasive flow meters may be found in the market, but they do not accurately sense flow rates of high viscosity fluids such as explosives in the extruder tube. For this type of measurement, errors may arise for various reasons such as, for example, a small diameter extruder tube, inconsistent fluid density, and/or mechanics of the particular type of flow meter.

The following U.S. patents describe various prior art systems that may be related to the above and/or other types of extruder measurement systems:

U.S. Pat. No. 4,517,145, issued May 14, 1985, to Knopf, discloses an improved extrusion die employing proximity sensors to directly measure the actual die gap during extrusion. The proximity sensor may be a capacitance-effect, or optical-effect sensor. Manual and automated closed-loop methods of operation are also disclosed.

U.S. Pat. No. 4,680,152, issued Jul. 14, 1987, and U.S. Pat. No. 4,728,278, issued Mar. 1, 1988, to Capelle, discloses a method for monitoring deviations in the dimensions of profile strips during production, as is an apparatus suitable for carrying out the method. The profile strip is formed from one or more rubber or thermoplastic material mixtures which are fed from one or more extrusion devices through nozzles into a common nozzle in an extrusion head. Pressure and temperature measuring means measure the extrusion pressure and temperature of each mixture. The profile strip thus produced then passes over weighing device which measures its weight per unit length. The measured value is transmitted to a regulating or control device and compared with a desired weight per unit length. When a deviation is ascertained, the regulation or control device which is also operatively connected to the pressure and temperature means and to adjustable drives for each extrusion device, compared the measured extrusion pressure and temperature values with desired values and adjusts the drive of one or more of the extrusion devices to cause the measured pressure and temperature values, and hence the measured weight per unit length, to be restored to their desired values.

U.S. Pat. No. 4,695,236, issued Sep. 22, 1987, to Predohl et al, discloses an apparatus for continuous extrusion of a plastic laminate that has at least two extrusion screw presses, an accumulator block, a transition unit, and an output die, from which the plastic laminate product is extruded. The accumulator block has a combining channel or canal therein which is fed by the extrusion screw presses. This combining canal is connected by way of the transition unit to the output die. The combining canal preferably has a rectangular cross section with rounded corners and at its upstream end is directly connected to a first extrusion screw press by way of a connecting canal coaxial with the combining canal. Downstreamwards below the connecting canal is found at least one input metering slot connected to the combining canal at one end and through a connecting apparatus at its other end to an additional extrusion screw press, this input metering slot lying between an input plate and an adjusting bar guided in an adjusting bar recess. The input metering slot extends over a rectangular side of the rectangular cross section combining canal, is directed slantingly downstreamwards, and opens into the combining canal. The adjusting bar has an adjustable beveled portion fitting into the combining canal and is adjustable perpendicular to the input metering slot in the adjusting bar recess so as to meter the flow of thermoplastic material from the additional extrusion screw press.

U.S. Pat. No. 4,740,146, issued Apr. 26, 1988, to Angelbeck, discloses an apparatus for producing plastic pipes by an extrusion process in which the wall thickness of the plastic pipe is controlled by the takeaway speed at which a soft plastic pipe is removed from a metal sizing sleeve. To measure the wall thickness of the soft plastic pipe advancing through the sizing sleeve for regulating the takeaway speed, a transducer emits ultrasonic sound through a plastic transmission line mounted in or on the sizing sleeve and interposed between the transducer and the plastic pipe. The time interval between the emission of a sonic pulse by the transducer and the detection of a reflected sonic pulse from the inner wall of the advancing soft plastic pipe is a function of the wall thickness of the plastic pipe in a soft plastic state.

U.S. Pat. No. 4,744,930, issued May 17, 1988, to Twist et al, discloses an extrusion process is controlled by feeding the material to be extruded from a supply station to an extruder and repeatedly weighing the supply station to calculate the throughput of the extruder. The initial line speed necessary to produce a predetermined weight/meter of extrudate is calculated and the line speed is adjusted accordingly. Subsequently, the throughput and the line speed are increased simultaneously, such that the weight/meter is maintained substantially constant until any one of a plurality of parameters such as line speed, screw speed, motor load current, extrudate temperature, melt pressure, etc reaches a predetermined maximum value. Thereafter either the line speed or extruder throughput is adjusted such as to maintain the weight/meter of the extrudate substantially constant at the desired value.

U.S. Pat. No. 5,543,105, issued Aug. 6, 1996, to Stummer et al, discloses a method and apparatus for injection molding. The injection molding machine includes a mold formed by a fixed mold half and a movable mold half cooperating with the fixed mold half for defining a mold cavity of the mold and a gate channel leading to the mold cavity. An injection piston is operatively associated with the mold cavity for pressing a melt via the gate channel into the mold cavity. A sensor device detects a melt front of the melt rising upstream of the mold cavity in a conveying direction of the melt at a predetermined detection height. The sensor device includes walls defining a measurement gap disposed at the detection height and extending transversely to the conveying direction of the melt. The measurement gap is at least partially penetrated by a fraction of the melt from the melt front when the melt front rises toward the mold cavity. A measuring device operatively associated with the measurement gap is responsive to a presence of the fraction of the melt in the measurement gap without directly contacting the melt and generates a measurement signal for controlling predetermined parameters of the machine.

U.S. Pat. No. 5,753,273, issued May 19, 1998, to Ratzenberger et al, discloses a system for monitoring and controlling the composition and the plastic deformation of material being processed in a processing machine has at least one measuring arrangement that includes a first pivotable lever connected to the processing machine at a location where the material flows. The first pivotable lever is biased by a force such that the first pivotable lever contacts the material with a force component acting at a right angle onto the surface of the material. A penetration body is connected to the first pivotable lever at an end thereof facing the material. The penetration body has a wedge shape tapered in a direction toward the surface of the material. A first travel sensor for sensing the depth of penetration of the penetration body into the material is provided. The first travel sensor is fixedly connected to the processing machine and cooperates with the first pivotable level at a distance from the penetration body. A second travel sensor for sensing the advancing speed of the material is substantially stationarily connected to the processing machine in the advancing direction of the material. A processing unit for processing signals received from the first and second travel sensors is provided. A control member for controlling the composition of the material is connected to the processing unit.

The above cited prior art does not disclose a system which provides a non-invasive extruder measurement system which may be used with high pressure, high viscosity fluids such as certain types of explosives. The advantages and benefits of solutions to the above described and/or related problems have been long sought without success. Consequently, those skilled in the art will appreciate the present invention that addresses the above and other problems.

SUMMARY OF THE INVENTION

It is a general purpose of the present invention to provide an improved piston-cylinder measurement system.

Another object of the present invention is to provide an extruder measurement system which measures the amount of a material extruded from a high pressure tube or cylinder without the sensor itself being inserted into the tube or the extruded material.

An advantage of this device is that it requires no wires to sense the material in the tube and there are no internal sensors inside the high pressure extruding tube.

These and other objects, features, and advantages of the present invention will become apparent from the drawings, the description given herein, and the appended claims. However, it will be understood that above listed objects and advantages of the invention are intended only as an aid in understanding certain aspects of the invention, are not intended to limit the invention in any way, and do not form a comprehensive or exclusive or restrictive list of objects, features, and advantages.

In accordance with the present invention, a piston-cylinder measurement system is provided for use with an extruder. The extruder may comprise a cylinder and a piston mounted within the cylinder for movement therein along a piston axis. The extruder measurement system may comprise one or more elements such as non-magnetic cylinder wall, a magnet mounted within the piston, and a plurality of magnetically activated switches mounted outside of the non-magnetic cylinder wall. The magnetically-activated switches may be positioned for activation in response to an axial position of the piston and may be mounted on a circuit board positioned outside the cylinder wall. As one possible example, the plurality of magnetically activated switches may comprises a plurality of reed switches. A plurality of resistors may be mounted on the circuit board so the switches and resistors comprise a network which is operable to produce a network signal output corresponding to a relative axial position of the piston within the cylinder.

The non-invasive measurement system may further comprise a steel magnetic flux guide mounted on the piston for guiding magnetic flux produced by the magnet. In one possible embodiment, the non-magnetic material of the cylinder may comprise a non-magnetic metal.

The present invention also comprises a method for making a piston-cylinder measurement system including steps such as for instance, generically providing a plurality of sensors mounted outside of a cylinder wall for an extruder which are aligned with an axis of movement of an extruder piston within the cylinder. Other generic steps may comprise providing that the plurality of sensors are responsive to a physical phenomena, such as magnetism, infrared, acoustic signals, or the like. The method may further comprise providing that a cylinder wall for an extruder cylinder comprise a material which is effectively invisible to the physical phenomena detected by the sensor such that any signals pass through the cylinder wall.

Other steps may comprise positioning a physical phenomena generator on the extruder piston such that the physical phenomena is directed radially outwardly to activate respective of the plurality of sensors to thereby indicate the relative position of the extruder piston within the extruder cylinder.

As a more specific non-limiting example, the plurality of sensors may comprise a plurality of magnetically activated sensors and the cylinder wall may comprise non-magnetic material, and the physical phenomena generator may comprise a magnet. In this example, other steps may comprise mounting a magnetic flux guide on the extruder piston to guide magnetic flux from the magnet radially outwardly.

The method may further comprise digitally displaying the piston position and/or digitally displaying a weight of extruded material.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
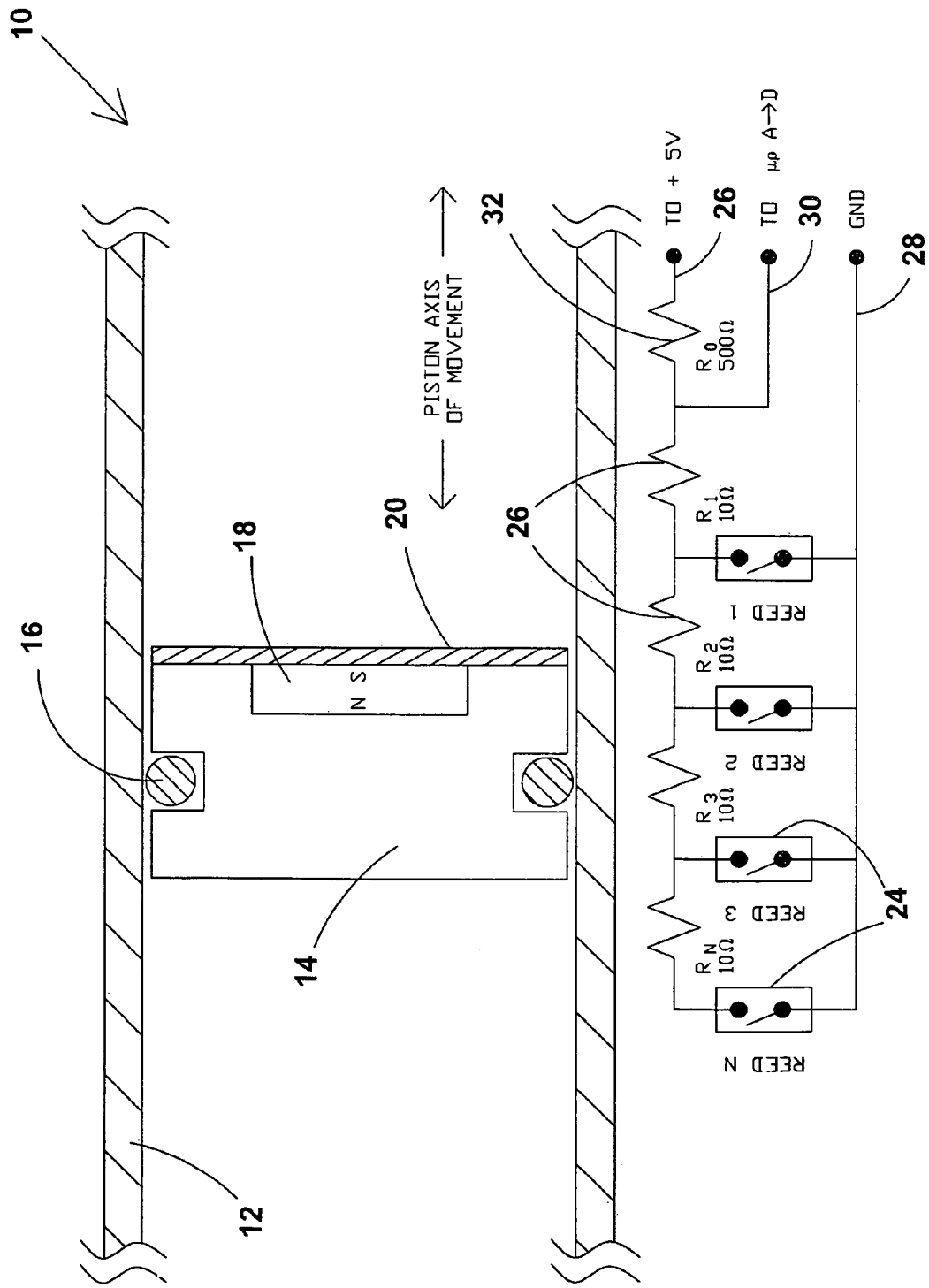
FIG. 1 is an elevational view, in section, showing the arrangement of measuring components of one possible embodiment of a non-invasive piston-cylinder measurement system in accordance with the invention.
Figure 2:
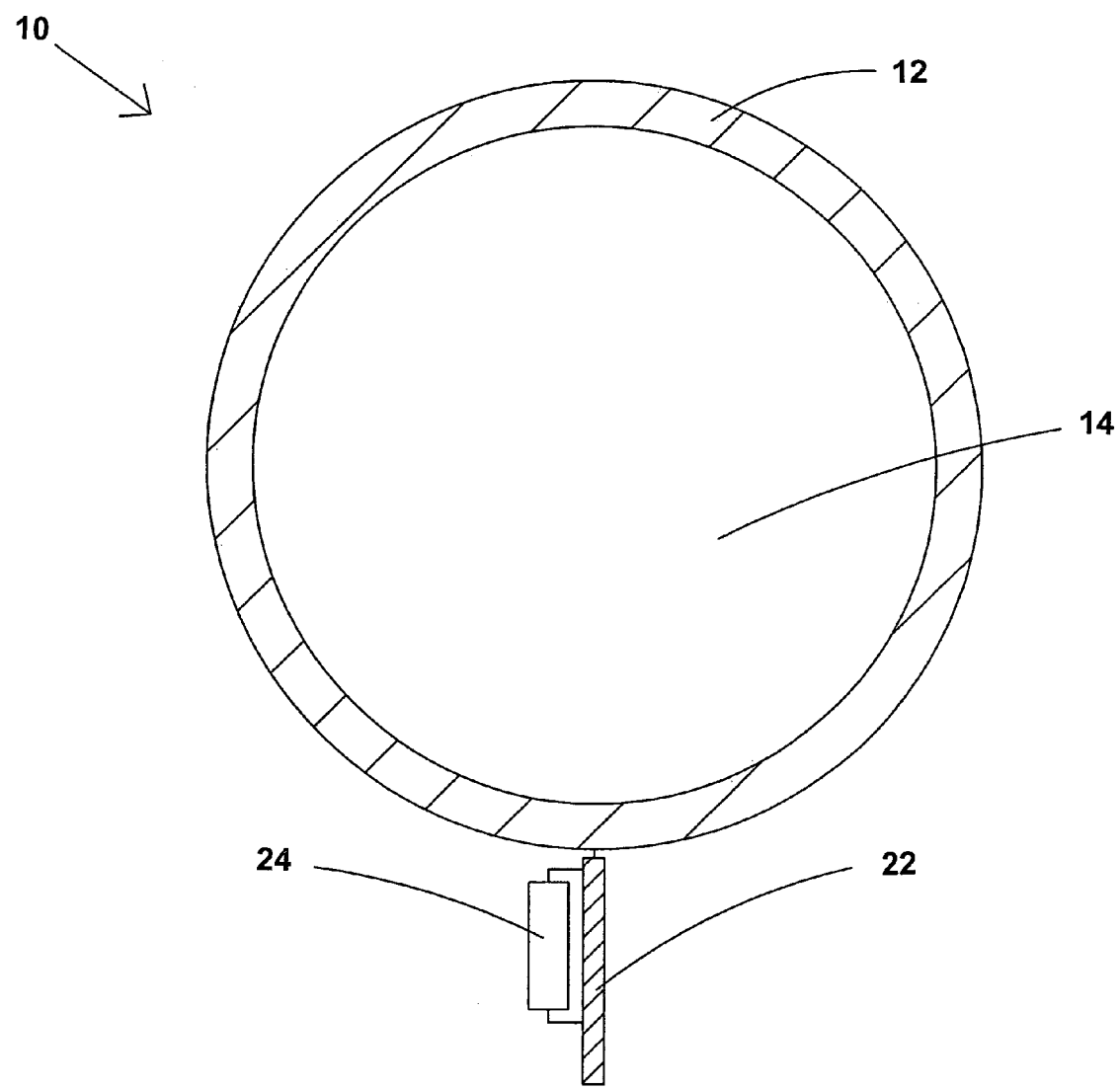
FIG. 2 is a side elevational view, in section, of the non-limiting example of the piston-cylinder measurement system from FIG. 1.

Referring now to the drawings and, more particularly, to FIGS. 1 and 2, there is shown an embodiment of a non-invasive piston-cylinder measurement system 10. The measurement system 10 is capable of measurements within a piston-cylinder extruder related to high viscosity, high pressure extruded materials such as certain types of explosives. The measurement system 10 operates even when the flow rate from the extruder is quite slow.

The measurement system 10 may be utilized with specialized extruder components such as a non-magnetic cylinder wall 12. The cylinder wall 12 may be comprised of materials suitably strong for supporting the forces resulting from containing high pressures applied to high viscosity materials. The cylinder wall 12 may comprise non-magnetic metals and alloys and/or other suitable materials as known to those skilled in the art.

In operation, piston 14 moves axially within cylinder wall 12, the piston 14 may comprise various types of seals such as seal 16.

A permanent magnet 18 is mounted within piston 14. The magnet 18 is mounted adjacent a front portion of the piston 14. To increase the effects of magnetic flux produced by the magnet 18, a magnetic flux guide 20 may also be mounted to the piston 14. The magnetic flux guide 20 may comprise steel or other magnetic materials suitable for conducting and directing magnetic flux radially outwardly through the non-magnetic cylinder wall 12.

The magnet 18 may be a rare earth magnet if desired. Piston 14 may also comprise suitably strong non-magnetic materials such as those discussed above but in one possible embodiment the piston is at least partially comprised of metal, such as the magnetic flux guide 20. The piston 14 may be urged or motivated to move in any desired manner along the piston axis of movement such as a result of hydraulic pressure or the like.

A circuit board 22 is mounted outside of the cylinder wall 12. The circuit board 22 may be oriented such that it is aligned with or generally parallel to the axis of movement of the piston 14. A plurality of surface-mount reed switches 24 may be secured to the circuit board 22. In this embodiment, the reed switches 24 are normally open but are responsive to the magnetic flux produced by the magnet 18 to close.

A circuit schematic and component layout of circuit board 22 is shown in FIG. 1 in which a plurality of resistors 26 and a plurality of reed switches 24 form a ladder network that acts as a voltage divider. In operation, is voltage applied between power terminal 27 and ground 28. Depending on which normally open-reed switches are activated, a D.C. or analog voltage or current output is provided at terminal 30 which may be converted to a digital value for use with a digital display and/or a processor and/or other uses as discussed below. The resistors may or may not comprise the same value.

In one possible example for use with a five volt power supply, resistor 32 may be 500 ohms and the remainder of the resistors may be 10 ohms. Any desired number of the reed switches 24 and resistors 26 may be utilized depending on the resolution of piston movement desired and/or the minimum spacing possible between reed switches 24. In one embodiment, the reed switches 24 may be spaced one-quarter inch apart over the travel length of the piston 14.

In operation, as the piston 14 moves axially within the non-magnetic cylinder wall 12, successive reed switches 24 close due to the magnetic flux produced by magnet 18. As successive reed switches 24 close, the resistor network is altered, thereby creating output signal changes at signal output 30. Magnetic flux is directed through the flux guide 20 for operating particular reed switches 24 so that the particular position of the piston 14 can be determined within the desired resolution determined by the spacing between the reed switches 24.

Accordingly, non-invasive piston-cylinder measurement system 10 electronically monitors the current and/or voltage levels which are directly related to the total extruder output of material, which may be explosive material. The measurement system 10 may be mounted in the chassis that holds the cylinder wall 12. The analog or D.C. output signal may be digitized in a microprocessor to provide a linear movement indication and a weight of extruded material (given a known density). The results may be displayed on an LCD, a remotely located computer, or the like as desired. The display may show both the amount of material remaining on or in the cylinder wall 12, and the amount of material extruded since the last reset of the device. If desired, the display may also show a general "Empty/Full meter" graphic that gives the user an indication of how much material is left in the extruder tube.

Other types of magnetically activated switches than reed switches may also be utilized if desired. For higher resolutions and/or faster speeds, infra-red or acoustic sensing devices might also be utilized along with suitable cylinder walls and transmitters or transponders mounted in the piston. The measurement system may be used within many types of piston-cylinder systems for relative measurement of the piston and cylinder and/or other related measurements such as flow out of or into the piston cylinder.

Many additional changes in the details, components, steps, component configurations, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A dispenser and measurement system comprising:
    a non-magnetic cylinder adapted to receive, store and extrude a predetermined quantity of high viscosity material;
    a piston mountable within said cylinder for movement therein along an axis adapted to displace said high viscosity material;
    a magnet mounted within said piston;
    a plurality of magnetically activated switches mounted outside of said cylinder;
    a magnetic flux guide coupled to said piston adapted to control a magnetic field emanating from said magnet to limit magnetic field interaction with said plurality of magnetically activated switches; and
    a flow and quantity indicator section adapted to receive a signal from one or more of said plurality of magnetically activated switches and display a volume remaining and flow data associated with each of said magnetically activated switches.

2. The measurement system in accordance with claim 1, wherein each of said plurality of magnetically activated switches is positioned in response to an axial position of said piston.

3. The measurement system of claim 1 further comprising a circuit board securable to the cylinder, said plurality of magnetically activated switches being mounted on said circuit board.

4. The measurement system in accordance with claim 3 wherein said plurality of magnetically activated switches are a plurality of reed switches.

5. The measurement system in accordance with claim 3 further comprising a plurality of resistors mounted on said circuit board, said plurality of magnetically activated switches and said plurality of resistors comprising a network which is operable to produce a network signal output corresponding to a relative axial position of said piston within said cylinder.

6. The measurement system in accordance with claim 3 wherein said circuit board is aligned with an axis of movement of said piston.

7. A method of making a piston-cylinder measurement, said method comprising the steps of:
- providing a non-magnetic cylinder adapted to receive, store and extrude a predetermined quantity of high viscosity material;
- providing a piston mountable within said cylinder for movement therein along an axis adapted to displace said high viscosity material;
- providing a plurality of sensors mounted outside of a wall of the cylinder which are aligned with an axis of movement of said piston within the cylinder;
- providing that said plurality of sensors responsive to a pre-determined physical phenomena;
- positioning and adapting a physical phenomena generator on the piston such that the pre-determined physical phenomena is directed radially outwardly;
- activating respective of said plurality of sensors;
- indicating the relative position of the piston within the cylinder; and
- providing a flow and quantity indicator section adapted to receive a signal from one or more of said plurality of sensors and display a volume remaining and flow data associated with each of said plurality of sensors.

8. The method of claim 7 wherein said activating step is induced by magnetic components of the sensors acting on the physical phenomena generator comprising a magnet.

9. The method of claim 8 further comprising the steps of mounting a magnetic flux guide on the piston and guiding magnetic flux from the physical phenomena generator radially outwardly.

10. The method of claim 8 further comprising the step of digitally displaying the position of the piston.

11. The method of claim 8 further comprising the steps of utilizing said piston and cylinder within an extruder and providing a digital display operable for displaying a weight of extruded material.

12. The method of claim 8 wherein magnet components are switches.

* * * * *